United States Patent
Nakai

(10) Patent No.: US 7,119,523 B2
(45) Date of Patent: Oct. 10, 2006

(54) SEMICONDUCTOR CHIP

(75) Inventor: Masakatsu Nakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 10/806,902

(22) Filed: Mar. 23, 2004

(65) Prior Publication Data

US 2004/0239395 A1    Dec. 2, 2004

(30) Foreign Application Priority Data

Mar. 31, 2003    (JP)    ............... P2003-093768

(51) Int. Cl.
  *G05F 1/40*    (2006.01)
  *H03L 7/06*    (2006.01)
  *H02H 7/10*    (2006.01)
(52) U.S. Cl. ..................... 323/268; 327/158
(58) Field of Classification Search ............... 323/268, 323/273–276; 327/149, 153, 158, 161, 271, 327/276, 277
  See application file for complete search history.

(56) References Cited

U.S. PATENT DOCUMENTS

| | | | |
|---|---|---|---|
| 5,856,951 A * | 1/1999 | Arimoto et al. ............ 365/226 |
| 6,313,622 B1 * | 11/2001 | Seki et al. ............... 324/76.82 |
| 6,657,467 B1 * | 12/2003 | Seki et al. .................. 327/158 |
| 6,686,788 B1 * | 2/2004 | Kim et al. .................. 327/280 |
| 6,693,473 B1 * | 2/2004 | Alexander et al. .......... 327/158 |

* cited by examiner

*Primary Examiner*—Matthew V. Nguyen
(74) *Attorney, Agent, or Firm*—Sonnenschein Nath & Rosenthal LLP

(57) ABSTRACT

A semiconductor chip able to reduce wasteful power loss due to a margin of power supply voltage considering variation of characteristics. A voltage setting signal for setting the power supply voltage to be supplied to a target circuit is generated in a voltage controller in the semiconductor chip based on a delay time of a delay signal of a replica circuit with respect to a clock signal. The maximum value of power supply voltage set by the voltage setting signal is restricted to the maximum value of the power supply voltage determined based on variations in production of the semiconductor chip. Accordingly, even when the value of the power supply voltage set based on the delay signal exceeds the maximum value due to the margin set considering the variation of characteristics, the voltage setting of the voltage setting signal output to the external power supply is restricted to the maximum value, so wasteful power loss can be suppressed.

7 Claims, 6 Drawing Sheets

14B

14A

14B

SEMICONDUCTOR CHIP

RELATED APPLICATION DATA

The present application claims priority to Japanese Application(s) No(s). P2003-093768 filed Mar. 31, 2003, which application(s) is/are incorporated herein by reference to the extent permitted by law.

BACKGROUND OF THE INVENTION

1. Field of the Invention

The present invention relates to a semiconductor chip having a monitor circuit for finding a critical path delay characteristic of a target circuit subjected by power supply voltage control, more particularly relates to technology for adaptively controlling a power supply voltage supplied to a target circuit LSI so as to reduce the power consumption.

2. Description of the Related Art

In recent years, in semiconductor circuits, it has been attempted to lower the power supply voltage so as to lower the power consumption. The reason is that an AC component of the consumed power of a semiconductor integrated circuit (LSI) is proportional to the square of the power supply voltage ($V^2$), so lowering the power supply voltage would be the most effective for lowering the power consumption of an LSI.

From such a viewpoint, in recent years, the method of dynamically controlling the power supply voltage with respect to the operating frequency of the LSI, process variations, and temperature changes so as to adaptively supply the minimum voltage enabling LSI operation has been reported.

As an example of realization of such adaptive power supply voltage control, it is known to mount a replica circuit for imitating a delay corresponding to the critical path of a target circuit on the same chip as the target circuit subjected by the power supply voltage control (see for example Japanese Unexamined Patent Publication (Kokai) No. 2000-216338, Japanese Unexamined Patent Publication (Kokai) No. 2000-295084, and Japanese Unexamined Patent Publication (Kokai) No. 2002-100967).

In those methods, the period of the clock signal supplied to the target circuit and the delay value of the replica circuit are compared and the power supply voltage is controlled so that the delay value of the replica circuit fits in an operation clock cycle.

Summarizing the disadvantages to be solved by the invention, usually, produced LSIs feature various variations in characteristics. For example, individual LSIs will differ in the relationship between the power supply voltage Vdd supplied to the LSIs and the maximum clock frequency fclk-max at which the operation of the LSIs is guaranteed.

FIG. 6 is a graph of examples of the relationship between the power supply voltage Vdd and the maximum clock frequency fclk-max. In FIG. 6, an abscissa indicates the power supply voltage Vdd, and an ordinate indicates the maximum clock frequency fclk-max.

A curve C1 shows the characteristic of a high speed LSI having the highest operating speed within the range of variation of characteristics. A curve C3 shows the characteristic of a low speed LSI having the lowest operation speed in this range of variation. A curve C2 shows the representative characteristic in this range of variation.

As shown in FIG. 6, in general, the maximum clock frequency fclk of a circuit tends to rise as the power supply voltage Vdd becomes higher. For this reason, when the same power supply voltage is given, an LSI having the characteristic of the curve C1 can be operated at a high speed at a clock frequency higher than LSIs having the characteristics of the curves C2 and C3.

When viewing this relationship for the same clock frequency, an LSI able to perform high speed operation becomes able to perform the operation at a power supply voltage lower than an LSI of a low speed. For example, in FIG. 6, in the case of a clock frequency f1, an LSI having the characteristic of the curve C3 requires a power supply voltage larger than the voltage V3 at the minimum, but LSIs having the characteristics of the curves C1 and C2 can operate at power supply voltages of as low as the voltages V1 and V2 smaller than that.

In general, since LSIs have such variations in characteristic, usually, in any sample, the operation of the LSI is guaranteed by supplying a power supply voltage the same as the voltage V3 or higher in a fixed manner.

As opposed to this, according to the above mentioned technique of controlling the power supply voltage in accordance with the delay characteristic of the target circuit as determined by the replica circuit, the power supply voltage of an LSI having a high speed characteristic can be suppressed lower than the power supply voltage of an LSI having a low speed characteristic. Therefore, the power consumption can be reduced further in comparison with the method of supplying a fixed power supply voltage.

Along with the reduction in the design rule and the increase in wafer size in recent years, however, not only the variation between different semiconductor wafers and the variation in the same wafer, but also local variation of characteristics in the same chip have become conspicuous. Namely, even in the same chip, non-ignorable deviations occur in the characteristics of transistors formed at different positions due to minute fluctuations in the production conditions.

Such variation of characteristics in the same chip occurs also between the replica circuit and the target circuit. Therefore, when controlling the power supply voltage by using a replica circuit, it is necessary to consider the amount of such variation in characteristics.

FIG. 7 is a graph illustrating a range of operation power supply voltage taking into account a local difference of characteristics between the target circuit and the replica circuit.

The range of power supply voltage in which normal operation is guaranteed in a target circuit covered by power supply voltage control becomes a range from the low limit voltage V1l to the high limit voltage V1h if considering only local variation of characteristics of the target circuit itself. Contrary to this, the range of power supply voltage when considering the local variation of characteristics of the replica circuit as well becomes a range from the low limit voltage Vrl to the high limit voltage Vrh, that is, is shifted to the high voltage side in comparison with the range from the low limit voltage V1l to the high limit voltage V1h. To prevent malfunctions in the target circuit due to shortage of the supplied voltage, it is necessary to set the low limit voltage Vrl to a voltage the same as the high limit voltage V1h or higher.

FIG. 8 is a graph illustrating the range of operating power supply voltage taking into consideration the local difference of characteristics between the target circuit covered by the power supply voltage control and the replica circuit for LSIs having characteristics of the curves C1 to C3 shown in FIG. 6.

The voltage V3 indicates a power supply voltage required for normally operation of the target circuit of the LSI having the lowest speed characteristic at the clock frequency f1. When using this circuit while fixing the clock signal at the frequency f1, by supplying even the power supply voltage of this voltage v3, normal operation of the target circuit is guaranteed. In the example of FIG. 8, in the LSIs from the middle speed to the high speed having the characteristics of the curves C1 and C2, even if taking into consideration the local difference of characteristics, the maximum value Vrh of the power supply voltage determined from the delay characteristic of the replica circuit will never exceed this voltage V3.

When the LSI has a relatively low speed characteristic, however, the maximum value Vrh of the power supply voltage determined from the delay characteristic of the replica circuit may become larger than the voltage V3. In such a case, in comparison with the method of supplying a fixed power supply voltage of the voltage V3, the disadvantage arises that the power consumption rather increases.

For example, in the case of the lowest speed LSI having the characteristic of the curve C3, an excess voltage (Vrh-–Vrl) corresponding to the variation of characteristics of the replica circuit is added to the voltage V3, therefore a wasteful voltage loss due to this excess voltage is induced.

SUMMARY OF THE INVENTION

An object of the present invention is to provide a semiconductor chip able to reduce wasteful power loss due to the margin of the power supply voltage set for taking into account the variation of characteristics.

According to the present invention, there is provided a semiconductor chip including: a delay monitoring means for finding a critical path delay characteristic of a target circuit subjected by power supply voltage control; a voltage setting signal generating means for generating a voltage setting signal for setting a power supply voltage to be supplied to the target circuit based on the result of monitoring of delay by the delay monitoring means; and a voltage setting restricting means for restricting the maximum value of the power supply voltage set in the voltage setting signal to a predetermined value.

According to the semiconductor chip of the present invention, the voltage setting signal generating means generates the voltage setting signal for setting the power supply voltage to be supplied to the target circuit based on the result of monitoring of delay by the delay monitoring means. The maximum value of the power supply voltage set in this voltage setting signal is restricted to a predetermined value by the voltage setting restricting means, for example, to the maximum value of the power supply voltage determined based on variations in production of the semiconductor chip.

Accordingly, even if the value of the power supply voltage set based on the result of monitoring of delay by the delay monitoring means exceeds this predetermined value, the voltage setting restricting means restricts the voltage setting of the voltage setting signal to this predetermined value.

The voltage setting restricting means may determine the maximum value of the power supply voltage to be restricted in accordance with a signal indicating an operation state of the target circuit, for example, a signal indicating an operation clock frequency of the target circuit.

In this case, the voltage setting restricting means may have a first storing means for storing a maximum voltage setting signal for setting the maximum value of the power supply voltage to be restricted, and a comparing means for comparing the maximum value of the power supply voltage set by the maximum voltage setting signal stored in the first storing means with the value of the power supply voltage set by the voltage setting signal and outputting the signal having a lower voltage setting and further may have a second storing means storing a plurality of maximum voltage setting signals and a maximum voltage signal transferring means for reading out a maximum voltage setting signal selected in accordance with the signal indicating the operation state of the target circuit from the second storing means and transferring the same to the first storing means.

According to the above circuit configuration, the maximum setting signal corresponding to the signal indicating the operation state of the target circuit is selected by the maximum voltage signal transferring means from among the plurality of maximum voltage setting signals stored in the second storing means, read out, and transferred to the first storing means. The comparing means compares the maximum value of the power supply voltage set by the maximum voltage setting signal stored in the first storing means with the value of the power supply voltage set by the voltage setting signal and outputs the signal having a lower voltage setting.

The voltage setting restricting means may include a plurality of first storing means for storing maximum voltage setting signals for setting the maximum value of the power supply voltage to be restricted; a selecting means for selecting a maximum voltage setting signal corresponding to a signal indicating the operation state of the target circuit from among the maximum voltage setting signals stored in the plurality of first storing means; and a comparing means for comparing the maximum value of the power supply voltage set by the maximum voltage setting signal selected by the selecting means with the value of the power supply voltage set by the voltage setting signal and outputting the signal having a lower voltage setting.

According to the above circuit configuration, the selecting means selects the maximum voltage setting signal corresponding to a signal indicating the operation state of the target circuit from among the maximum voltage setting signals stored in the plurality of first storing means. The comparing means compares the maximum value of the power supply voltage set by the maximum voltage setting signal selected by the selecting means with the value of the power supply voltage set by the voltage setting signal and outputs the signal having a lower voltage setting.

The first storing means may be a storing means able to electrically erase and rewrite the stored signals or may be a storing means including one or more fuse circuits and storing signals according to a conductive state or a nonconductive state of the fuse in the fuse circuits.

BRIEF DESCRIPTION OF THE DRAWINGS

These and other objects and features of the present invention will become clearer from the following description of the preferred embodiments with reference to the accompanying drawings, in which.

DESCRIPTION OF THE PREFERRED EMBODIMENTS

Below, preferred embodiments will be described with reference to the accompanying drawings.

First Embodiment

Figure 1:
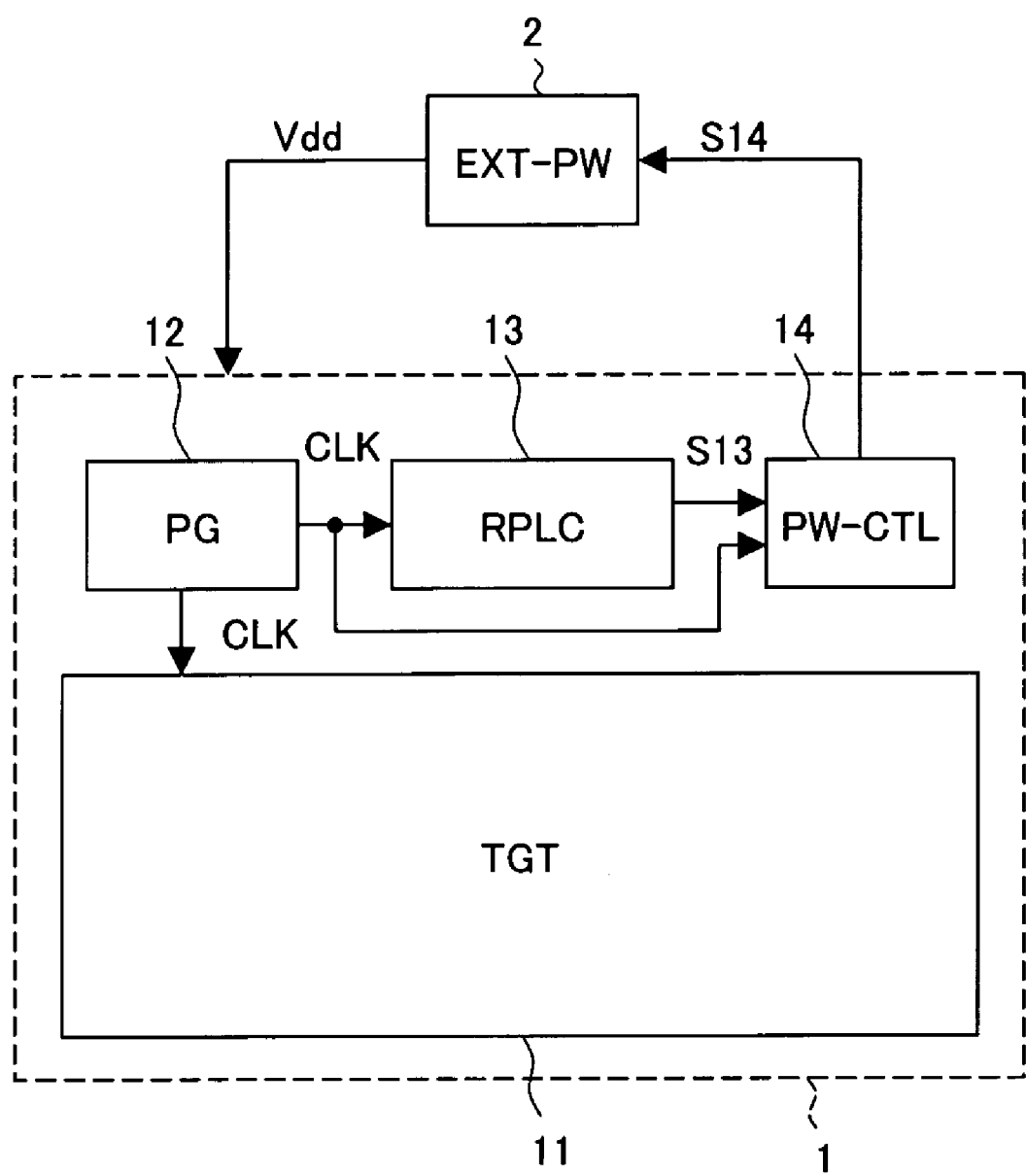
FIG. 1 is a block diagram of an example of the circuit configuration of a semiconductor chip according to a first embodiment of the present invention.

FIG. 1 is a block diagram of an example of the circuit configuration of a semiconductor chip according to a first embodiment of the present invention.

A semiconductor chip 11 has a target circuit (TGT) 11 subjected by power supply voltage control, a pulse generator (PG) 12, a replica circuit (RPLC) 13 having an operation time substantially the same as the target circuit (TGT) 11, and a power supply voltage controller (PW-CTL) 14.

The semiconductor chip 11 operates by receiving power supply voltage Vdd of an external power supply (EXT-PW) 2 controlled in voltage value in accordance with a voltage setting signal S14.

Note that the target circuit 11 is an embodiment of the target circuit subjected by power supply voltage control of the present invention.

The target circuit 11 includes main circuits of the semiconductor chip 1. For example, it includes a digital signal processor (DSP) operating in synchronization with a clock signal CLK output from the pulse generator 12, a CPU (central processor unit), and other various circuits. These circuits operate by receiving the power supply voltage Vdd supplied from the external power supply 2.

The pulse generator 12 generates the clock signals CLK supplied to the target circuit 11 and the replica circuit 13.

The replica circuit 13 is a circuit for finding the critical path delay characteristic of the target circuit 11 subjected by power supply voltage control and is an embodiment of the delay monitoring means of the present invention.

The replica circuit 13 has a plurality of delay elements operating when supplied with the power supply voltage Vdd common to that for, for example, the target circuit 11. These delay elements imitate the delay components which become factors of signal propagation delay inside the target circuit 11. The clock signal CLK supplied to the replica circuit 13 is given a delay imitated in this way and output as a delay signal S13.

The power supply voltage controller 14 generates the voltage setting signal S14 for setting the power supply voltage Vdd to be supplied to the target circuit 11 based on the delay of the delay signal S13 output from the replica circuit 13 with respect to the clock signal CLK. Note that the maximum value of the power supply voltage Vdd set by the voltage setting signal S14 is restricted to a predetermined value. For example, it is restricted to the maximum value Vmax of the power supply voltage determined based on the result of inspection of variations in production of the semiconductor chip 11. For this reason, the power supply voltage Vdd supplied from the external power supply (EXT-PW) 2 is restricted to the maximum value Vmax.

Figure 2:
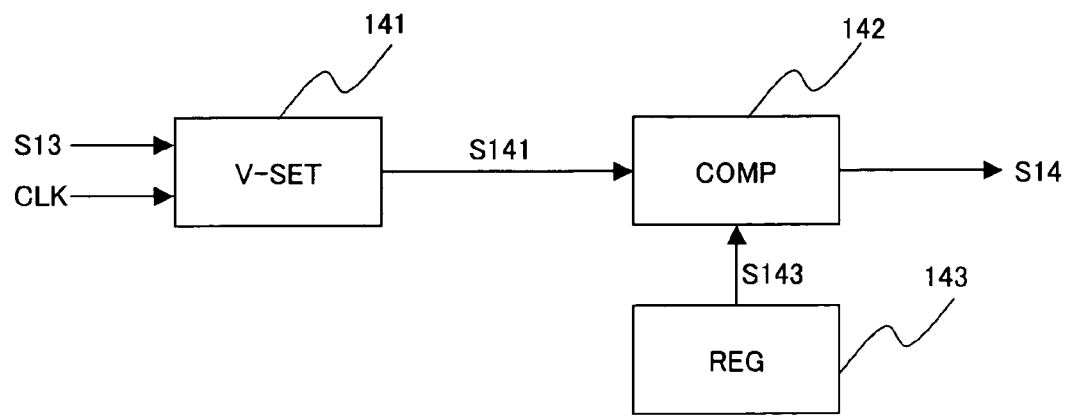
FIG. 2 is a block diagram of an example of the configuration of a power supply voltage controller included in a semiconductor chip according to the first embodiment of the present invention.

FIG. 2 is a block diagram of an example of the configuration of the power supply voltage controller 14 shown in FIG. 1.

The power supply voltage controller 14 has a voltage setting signal generator (V-SET) 141, a comparator (COMP) 142, and a register (REG) 143.

The voltage setting signal generator 141 is an embodiment of the voltage setting signal generating means of the present invention. The comparator 142 is an embodiment of the comparing means of the present invention. The register 143 is an embodiment of the first storing means of the present invention. The unit including the comparator 142 and the register 143 is an embodiment of the voltage setting restricting means of the present invention.

The voltage setting signal generator 141 detects a delay time of the delay signal S13 output from the replica circuit 13 with respect to the clock signal CLK and generates a voltage setting signal S141 for setting the power supply voltage Vdd to be supplied to the target circuit 11 based on this detection result.

Looking at the voltage setting signal S141, for example, phases of the clock signal CLK and the delay signal S13 of the replica circuit 13 are compared. When the delay signal S13 is delayed by one cycle or more from the clock signal CLK, a voltage setting signal S141 set so as to raise the power supply voltage Vdd is generated. When the delay signal S13 is advanced by one cycle or more, a voltage setting signal S141 set so as to make the power supply voltage Vdd lower is generated.

The register 143 stores the maximum voltage setting signal S143 for setting the maximum value Vmax of the power supply voltage to be restricted.

As the register 143, use can be made of for example a storage device such as a RAM or flash ROM able to electrically erase stored signals and rewrite the data. By using such an electrically rewritable storage device, after the production and evaluation of the semiconductor chip, a suitable maximum value Vmax for the individual semiconductor chip can be set. Further, even after a semiconductor chip is shipped from the factory producing the semiconductor chips, the set maximum value Vmax can be easily changed.

The register 143 may also be a storage device for storing a signal according to whether a fuse in one or more fuse circuits is in the conductive state or the nonconductive (disconnected) state. Even when using such a storage device, a suitable maximum value Vmax for an individual semiconductor chip can be set. The value is physically written by the disconnection of fuses, therefore a once written value cannot be changed, but the circuit size and the power consumption can be made smaller in comparison with an electrically rewritable storage device.

The comparator 142 compares the maximum value Vmax of the power supply voltage set by the maximum voltage setting signal S143 stored in the register 143 with the value of the power supply voltage set by the voltage setting signal S141 and outputs the signal having a lower voltage setting as the voltage setting signal S141. Accordingly, where the value of the power supply voltage set by the voltage setting signal S141 exceeds the maximum value Vmax, the voltage setting of the voltage setting signal S14 is restricted to the maximum value Vmax.

Next, an explanation will be given of the control operation of the power supply voltage Vdd in a semiconductor chip 1 having the above configuration.

The clock signal CLK generated at the pulse generator 12 is given a delay imitating the signal propagation delay characteristic of the target circuit 11 by the replica circuit 13 and output as the delay signal S13.

The voltage setting signal generator 141 detects the delay time of this delay signal S13 with respect to the clock signal CLK and generates a voltage setting signal S141 for setting the power supply voltage Vdd to be supplied to the target circuit 11 based on this detection result.

The generated voltage setting signal S141 is compared with the maximum voltage setting signal S143 stored in the register 143 at the comparator 142, and the signal having a lower voltage setting is output as the voltage setting signal S14 to the external power supply 2.

At the external power supply 2, the power supply voltage Vdd to be supplied to the semiconductor chip 1 is controlled so as to become equal to the voltage set by this voltage setting signal S14.

According to the semiconductor chip 1 having the configuration shown in FIG. 1 and FIG. 2, the magnitude of the power supply voltage Vdd is set in accordance with the delay characteristic of the target circuit 11 determined based on the delay signal S13 of the replica circuit 13. When the voltage set in this way reaches the maximum value Vmax, the voltage setting with respect to the external power supply 2 is restricted so as not to exceed this maximum value Vmax.

Figure 6:
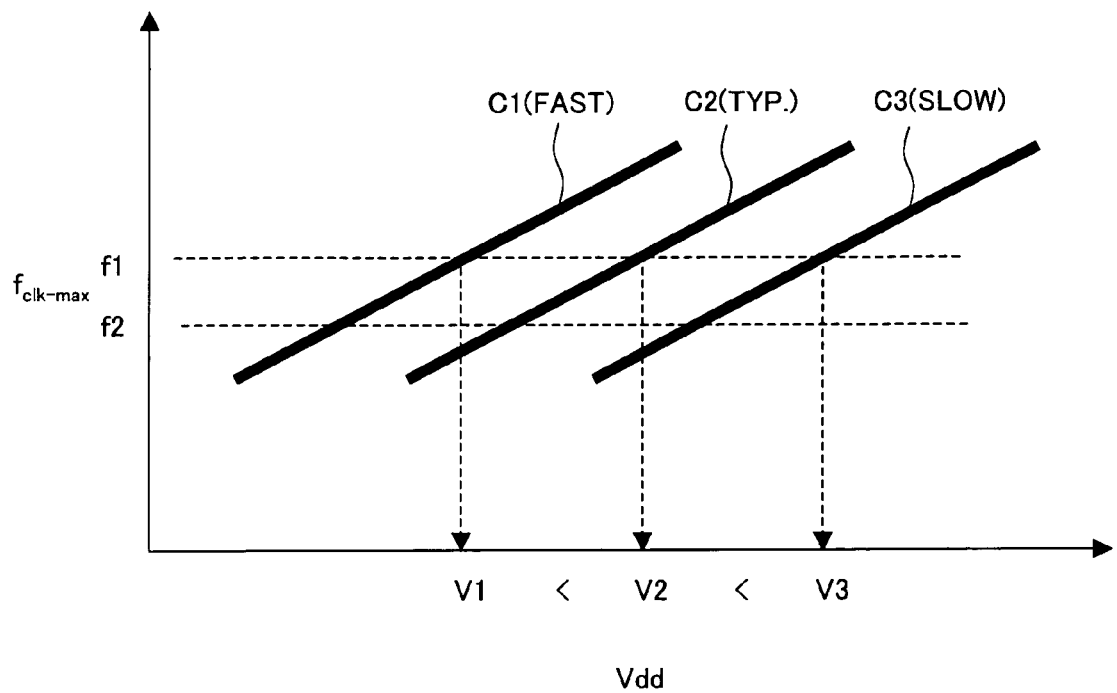
FIG. 6 is graph illustrating examples of the relationship between the power supply voltage and the maximum clock frequency in an embodiment of the present invention.
Figure 7:
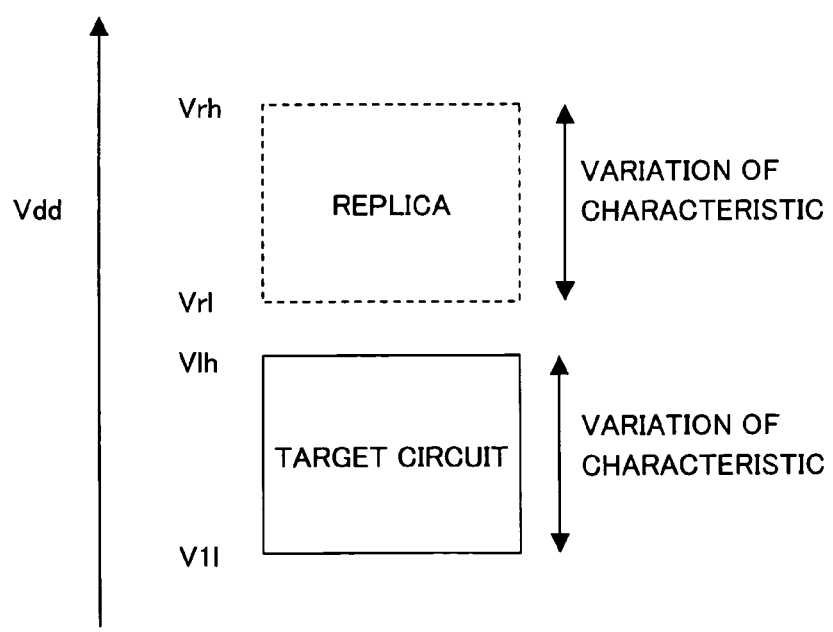
FIG. 7 is a graph illustrating a range of operation power supply voltage in a case taking into account a local difference of characteristics between a target circuit subjected by power supply voltage control and a replica circuit in an embodiment of the present invention.
Figure 8:
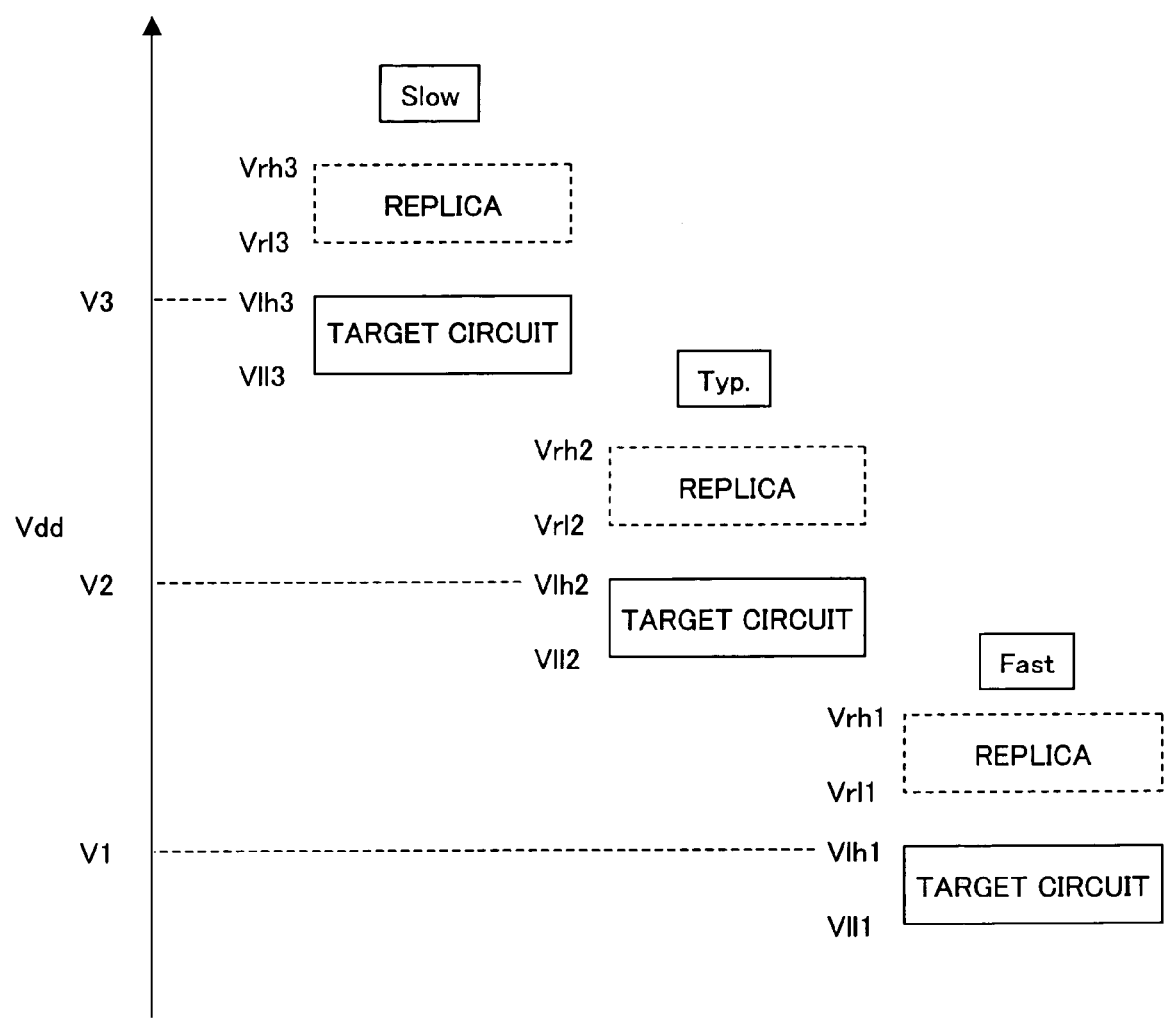
FIG. 8 is a graph illustrating a range of operation power supply voltage taking into account a local difference of characteristics between a target circuit subjected by power supply voltage control and a replica circuit in an embodiment of the present invention for LSIs having characteristics of curves shown in FIG. 6.

Accordingly, in a semiconductor chip 1 having a low speed characteristic as indicated by the curve C3 of FIG. 6, even in a case where the voltage setting of the voltage setting signal S141 generated based on the delay signal S13 of the replica circuit 13 exceeds the maximum value Vmax due to the margin set considering the variation of characteristics between the target circuit and the replica circuit 13, the voltage set with respect to the external power supply 2 can be restricted to this maximum value Vmax or less As a result, the excessive supply of the power supply voltage exceeding the maximum value Vmax can be prevented, and wasteful power loss can be reduced.

Second Embodiment

Figure 3:
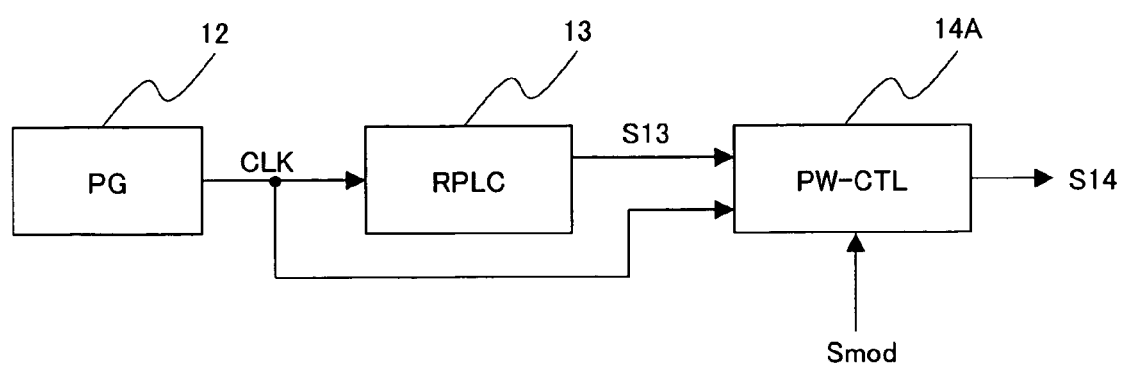
FIG. 3 is a diagram of a pulse generator, a replica circuit, and a power supply voltage controller included in a semiconductor chip according to a second embodiment of the present invention.

FIG. 3 is a block diagram of a pulse generator 12, a replica circuit 13, and a power supply voltage controller 14A included in a semiconductor chip 1A according to a second embodiment of the present invention.

The difference of the second embodiment from the first embodiment resides in that the power supply voltage controller 14 shown in FIG. 1 is replaced by the power supply voltage controller 14A explained below.

The power supply voltage controller 14A generates a voltage setting signal S14 for setting the power supply voltage Vdd to be supplied to the target circuit 11 based on the delay of the delay signal S13 output from the replica circuit 13 with respect to the clock signal CLK. Note that the maximum value of the power supply voltage Vdd set by the voltage setting signal 14 is restricted to the maximum value Vmax of the power supply voltage determined based on for example the result of inspection of variations in production of the semiconductor chip 11.

The power supply voltage controller 14A determines the maximum value Vmax of the power supply voltage to be restricted in accordance with a signal indicating the operation state of the target circuit 11, for example, a signal Smod indicating the frequency of the clock signal CLK supplied to the target circuit 11.

Figure 4:
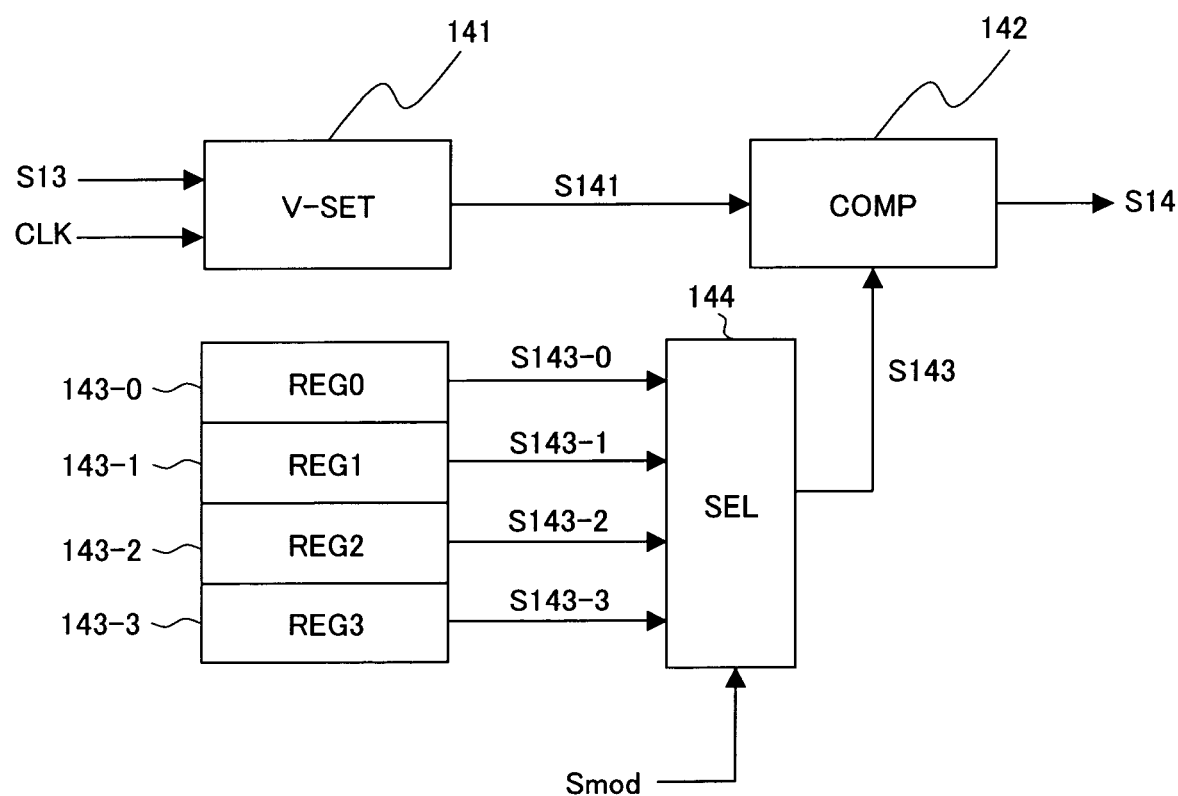
FIG. 4 is a block diagram of an example of the configuration of the power supply voltage controller included in a semiconductor chip according to the second embodiment of the present invention.

FIG. 4 is a block diagram of an example of the configuration of the power supply voltage controller 14A shown in FIG. 3.

The power supply voltage controller 14A shown in FIG. 4 has a voltage setting signal generator 141, a comparator 142, registers 143-0, . . . , 143-3, and a selector 144. Note that the same notations in FIG. 4 and FIG. 2 indicate the same components.

The registers 143-0, . . . , 143-3 are an embodiment of the plurality of first storing means of the present invention. The selector 144 is an embodiment of the selecting means of the present invention. The unit including the comparator 142, the registers 143-0, . . . , 143-3, and the selector 144 is an embodiment of the voltage setting restricting means of the present invention.

The registers 143-0, . . . , 143-3 store the maximum voltage setting signals S143-0 to S143-3 for setting a plurality of power supply voltage maximum values Vmax0 to Vmax3 determined in accordance with the frequency of the clock signal CLK to be supplied to the target circuit 11. For the registers 143-0, . . . , 143-3, in the same way as the register 143, electrically erasable and rewritable storage devices, storage devices including fuse circuits, etc. can be applied.

The selector 144 selects a signal corresponding to the signal Smod indicating the frequency of the clock signal CLK from among the maximum voltage setting signals S143-0 to S143-3 stored in the registers 143-0, . . . , 143-3 and outputs the same as the maximum voltage setting signal S143.

According to the semiconductor chip 1A having the above configuration, in the same way as the above semiconductor chip 1, the voltage setting signal S141 for setting the power supply voltage Vdd to be supplied to the target circuit 11 is generated based on the delay time of the delay signal S13 of the replica circuit 13 with respect to the clock signal CLK.

Further, the selector 144 selects a signal corresponding to the signal Smod indicating the frequency of the clock signal CLK from among the plurality of maximum voltage setting signals S143-0 to S143-3 and outputs the same as the maximum voltage setting signal S143.

The comparator 142 compares the maximum voltage setting signal S143 selected at the selector 144 with the generated voltage setting signal S141 and outputs the signal having a lower voltage setting as the voltage setting signal S14 to the external power supply 2.

The external power supply 2 controls the power supply voltage Vdd to be supplied to the semiconductor chip 1 so as to become equal to the voltage set by this voltage setting signal S14.

In this way, according to the semiconductor chip 1A, the voltage setting with respect to the external power supply 2 is restricted so as not to exceed the maximum value Vmax. Therefore, in the same way as the semiconductor chip 1, power loss can be reduced.

This maximum value Vmax is determined in accordance with a signal Smod indicating the operation state of the target circuit 11 such as for example a signal indicating the clock frequency to be supplied to the target circuit 11. For this reason, even when the operation state of the target circuit 11 changes, the maximum value Vmax of a suitable power supply voltage is set in accordance with this change. Accordingly, wasteful power loss due to the supply of excess power supply voltage can be effectively suppressed.

When the operation clock frequency is the frequency f1 in FIG. 6, by setting the maximum value Vmax of the voltage setting with respect to the external power supply 2 to the voltage V3, the supply of excess power supply voltage can be effectively prevented. When the operation clock frequency is changed to the frequency f2 lower than the frequency f1, however, the minimum operation power supply voltage considering variations in production becomes lower than the voltage V3. In this state, if the maximum value Vmax (voltage V3) of the frequency f1 is used as it is, there is a possibility that an excess power supply voltage will be supplied regardless of the fact that operation is possible even at a lower power supply voltage. According to the above semiconductor chip 1A, the suitable maximum value Vmax is selected in accordance with the signal Smod indicating the operation clock frequency. Therefore, the excess supply of the power supply voltage is prevented, and wasteful power loss can be reduced.

Along with the spread of mobile electronic devices, reduction of power consumption has become a major issue. The technique of lowering of power consumption by dynamically changing the clock frequency in accordance with the operating state of the device is frequently employed. If the above semiconductor chip 1A is applied to such an electronic device, since the suitable maximum value of the power supply voltage is set in accordance with the operation clock frequency, wasteful power loss can be further reduced.

Third Embodiment

Figure 5:
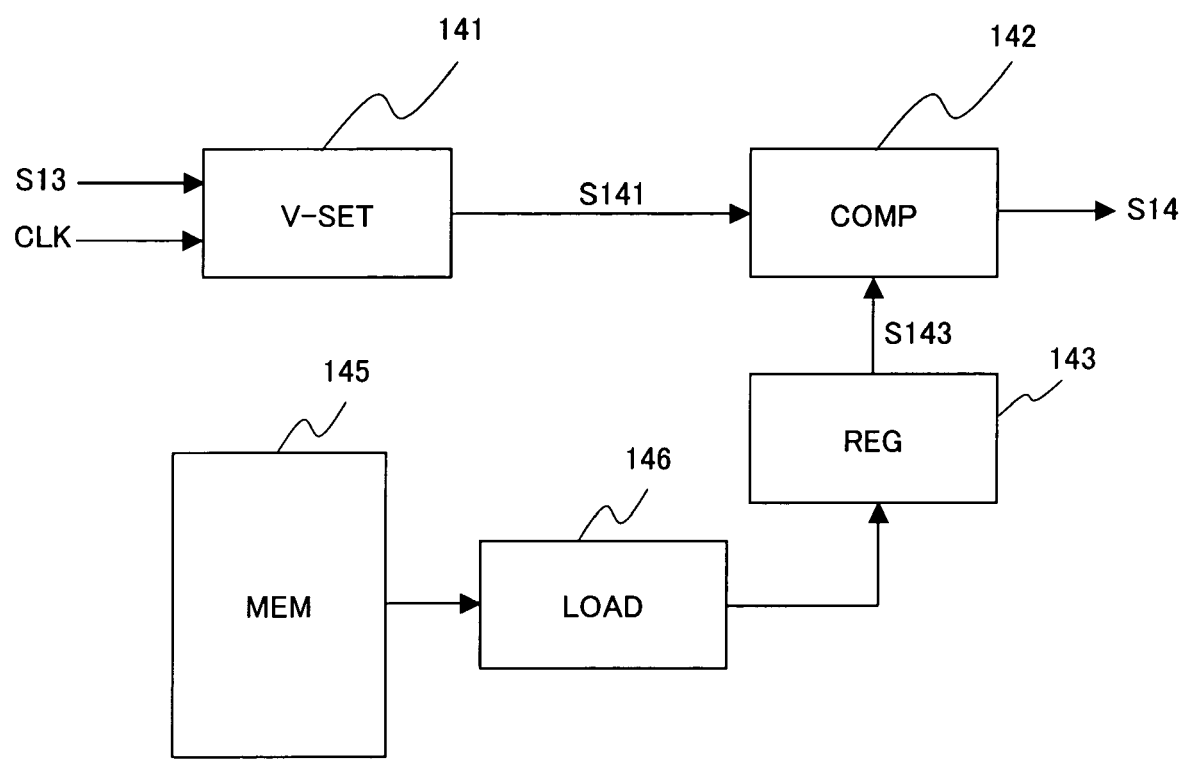
FIG. 5 is a block diagram of an example of the configuration of the power supply voltage controller included in a semiconductor chip according to a third embodiment of the present invention.

FIG. 5 is a block diagram of an example of the configuration of a power supply voltage controller 14B included in a semiconductor chip 1B according to a third embodiment.

The difference of the third embodiment from the first embodiment resides in that the power supply voltage controller 14 shown in FIG. 1 is replaced by the power supply voltage controller 14B shown in FIG. 5.

The power supply voltage controller 14B shown in FIG. 5 has the same configuration as that of the power supply voltage controller 14 shown in FIG. 2 and, at the same time, has a memory 145 and a maximum voltage signal loader 146.

The memory 145 is an embodiment of the second storing means of the present invention.

The maximum voltage signal loader 146 is an embodiment of the maximum voltage signal transferring means of the present invention.

The memory 145 stores a plurality of maximum voltage setting signals for setting a plurality of power supply voltage maximum values determined in accordance with the operation state of the target circuit 11, for example, the frequency of the clock signal CLK.

As the memory 145, use can be made of various storage devices such as a SRAM and DRAM. For example, it is also possible to use a general purpose memory accessed also from other circuits in the target circuit 11.

The maximum voltage signal loader 146 reads out the maximum voltage setting signal selected in accordance with a signal indicating the operation state of the target circuit 11, for example, the signal Smod indicating the frequency of the clock signal CLK, from the memory 145 and transfers (loads) the same to the register 143.

According to the semiconductor chip 1B having the above configuration, in the same way as the semiconductor chip 1, the voltage setting signal S141 for setting the power supply voltage Vdd to be supplied to the target circuit 11 is generated based on the delay time of the delay signal S13 of the replica circuit 13 with respect to the clock signal CLK.

Further, the maximum voltage signal loader 146 reads out the signal selected in accordance with the signal Smod indicating the frequency of the clock signal CLK from among the plurality of maximum voltage setting signals stored in the memory 145 and loads it in the register 143.

The comparator 142 compares the maximum voltage setting signal S143 loaded in the register 143 and the generated voltage setting signal S141 and outputs the signal having a lower voltage setting as the voltage setting signal S14 to the external power supply 2.

The external power supply 2 controls the power supply voltage Vdd to be supplied to the semiconductor chip 1 so as to become equal to the voltage set by this voltage setting signal S14.

In this way, according to the above semiconductor chip 1B, the voltage setting with respect to the external power supply 2 is restricted so as not to exceed the maximum value Vmax. Therefore the power loss can be suppressed in the same way as the semiconductor chip 1.

This maximum value Vmax is determined in accordance with a signal Smod indicating the operation state of the target circuit 11 such as for example a signal indicating the clock frequency to be supplied to the target circuit 11. Therefore, in the same way as the semiconductor chip 1A, wasteful power loss due to the excess supply of the power supply voltage can be reduced.

Further, according to the semiconductor chip 1B, a configuration loading the maximum voltage setting signal to one register from the general purpose memory 145 is provided. Therefore, in comparison with a configuration providing a plurality of dedicated registers for storing the maximum voltage setting signal as in the semiconductor chip 1A, the circuit size and the power consumption can be made smaller.

Further, with the configuration of the semiconductor chip 1A providing the dedicated registers, an increase of the number of the power supply voltage maximum values to be set cannot be handled without changing the circuit, but according to the semiconductor chip 1B, it is possible to increase the storage region of the maximum voltage setting signals secured in the memory 145 by a change of the software, therefore such a change can be flexibly dealt with.

The present invention is not limited to the above embodiments.

For example, the number of the registers was four in the voltage control circuit 14A shown in FIG. 4, but the present invention is not limited to this. Any number of registers can be provided.

Further, in the semiconductor chip 1 shown in FIG. 1, the power supply was provided outside of the semiconductor chip, but the present invention is not limited to this. The present invention can also be applied to a case where part or all of the power supply is included inside the semiconductor chip.

Summarizing the effects and features of the invention, according to the present invention, wasteful power loss occurring due to the margin of the power supply voltage set considering variations in characteristics can be reduced.

Further, according to the present invention, even when the operation state of the target circuit subjected by power supply voltage control changes, the maximum value of the suitable power supply voltage corresponding to this is set, and wasteful power loss can be reduced.

What is claimed is:

1. A semiconductor chip comprising:
a delay monitoring means for finding a critical path delay characteristic of a target circuit subjected by power supply voltage control;
a voltage setting signal generating means for generating a voltage setting signal for setting a power supply voltage to be supplied to the target circuit based on the result of monitoring of delay by the delay monitoring means; and
a voltage setting restricting means for restricting the maximum value of the power supply voltage set in the voltage setting signal to a predetermined value,
wherein said voltage setting restricting means comprises:
a first storing means for storing a maximum voltage setting signal for setting the maximum value of the power supply voltage to be restricted, and
a comparing means for comparing the maximum value of the power supply voltage set by the maximum voltage setting signal stored in the first storing means with the value of the power supply voltage set by the voltage setting signal and outputting the signal having a lower voltage setting.

2. A semiconductor chip as set forth in claim 1, wherein said first storing means is able to electrically erase and rewrite the stored signals.

3. A semiconductor chip as set forth in claim 1, wherein said first storing means includes one or more fuse circuits and stores signals according to a conductive state or a nonconductive state of the fuse in the fuse circuits.

4. A semiconductor chip as set forth in claim 2, further comprising:
a second storing means for storing a plurality of maximum voltage setting signals, and
a maximum voltage signal transferring means for reading out a maximum voltage setting signal selected in accordance with the signal indicating the operation state of the target circuit from the second storing means and transferring the same to the first storing means.

5. A semiconductor chip comprising;
a delay monitoring means for finding a critical path delay characteristic of a target circuit subjected by power supply voltage control;
a voltage setting signal generating means for generating a voltage setting signal for setting a power supply voltage to be supplied to the target circuit based on the result of monitoring of delay by the delay monitoring means; and
a voltage setting restricting means for restricting the maximum value of the power supply voltage set in the voltage setting signal to a predetermined value,
wherein said voltage setting restricting means determines the maximum value of the power supply voltage to be restricted in accordance with a signal indicating an operation state of the target circuit, and
wherein said voltage setting restricting means includes:
a plurality of first storing means for storing maximum voltage setting signals for setting the maximum value of the power supply voltage to be restricted;
a selecting means for selecting a maximum voltage setting signal corresponding to a signal indicating the operation state of the target circuit from among the maximum voltage setting signals stored in the plurality of first storing means; and
a comparing means for comparing the maximum value of the power supply voltage set by the maximum voltage setting signal selected by the selecting means with the value of the power supply voltage set by the voltage setting signal and outputting the signal having a lower voltage setting.

6. A semiconductor chip as set forth in claim , wherein said first storing means is able to electrically erase and rewrite the stored signals.

7. A semiconductor chip as set forth in claim 5, wherein said first storing means includes one or more fuse circuits and stores signals according to a conductive state or a nonconductive state of the fuse of the fuse circuits.

* * * * *